United States Patent [19]

Arnold et al.

[11] 4,312,906
[45] Jan. 26, 1982

[54] STOP-OFF COMPOSITION FOR METALS

[75] Inventors: Charles R. Arnold; Donald A. Pennington, both of Seattle, Wash.

[73] Assignee: The Boeing Company, Seattle, Wash.

[21] Appl. No.: 160,000

[22] Filed: Jun. 16, 1980

Related U.S. Application Data

[62] Division of Ser. No. 854,452, Nov. 23, 1977, Pat. No. 4,230,614.

[51] Int. Cl.³ .................. B23K 35/36; B32B 3/18; B32B 5/16; B32B 15/08
[52] U.S. Cl. .................................. 428/204; 156/289; 156/290; 228/118; 427/287; 428/208; 428/209; 428/328; 428/461
[58] Field of Search ............... 156/289, 290; 228/118, 228/189, 215; 428/198, 201, 323, 328, 204, 205, 461, 920, 921, 195, 206, 207, 208, 209; 260/33.6 PQ, 42.46, 45.9 R; 526/6; 427/287

[56] References Cited

U.S. PATENT DOCUMENTS 3,214,251 10/1965 Brick et al. .................. 228/118
3,927,817 12/1975 Hamilton et al. ............ 228/157

Primary Examiner—Bruce H. Hess
Attorney, Agent, or Firm—Morris A. Case; Bernard A. Donahue

[57] ABSTRACT

A filler of polyisobutylene dissolved in a solvent is combined with boron nitride to form a stop-off compound used as a parting agent when diffusion bonding metals. A uniform coating of the compound is applied with screen printing methods prior to bonding.

4 Claims, 2 Drawing Figures

STOP-OFF COMPOSITION FOR METALS

This is a division of application Ser. No. 854,452, filed Nov. 23, 1977, now U.S. Pat. No. 4,230,614.

BACKGROUND OF THE INVENTION

Diffusion bonding is a well known and important method of joining metals. When diffusion bonding, it is often desirable to bond the metal in isolated sharply defined areas, and to prevent bonding in other contacting surfaces of the parts to be joined. To prevent bonding in selected areas a coating of a stop-off material is applied. It is known to use powdered boron nitride combined in an inorganic binder such as alumina, magnesium silicate or aluminum phosphate in an aqueous vehicle to form a stop-off for titanium. Coatings using these stop-offs are suitable for brushing or spraying applications, but are unsatisfactory for application by screen printing.

U.S. Pat. No. 2,772,180, to Neel et al, discloses a stop-off material for metals of an aqueous solution of colloidal graphite and calcium carbonate.

SUMMARY OF THE INVENTION

Polyisobutylene is reduced to small size particles and is mixed in an aliphatic or aromatic hydrocarbon until the polyisobutylene is completely dissolved. Powdered boron nitride is then mixed into the dissolved polyisobutylene to form a stop-off compound.

DETAILED DESCRIPTON

Figure 1:
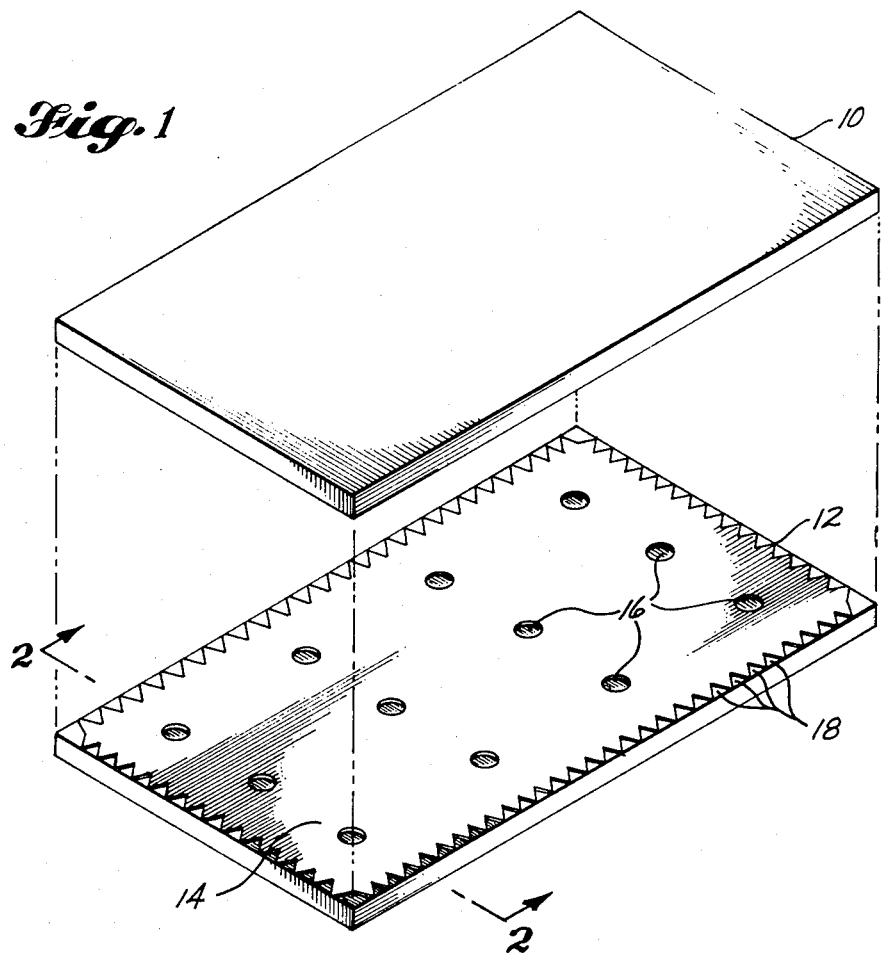
FIG. 1 shows a perspective view of layers of metal prepared for patterned bonding by use of this invention.
Figure 2:
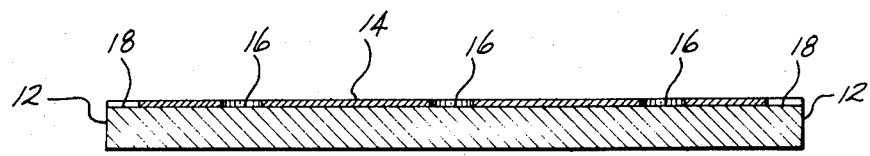
FIG. 2 shows a sectional view taken along line 2—2 of FIG. 1.

Polyisobutylene, preferably the polymer having a molecular weight of about 81,000 to 99,000, may be obtained from Enjay Co., Inc. under the name Vistanex MM L-100. This solid rubbery substance is reduced to small size particles and placed in a container. A solvent is poured over the polyisobutylene and the batch mixed until the polymer is completely dissolved to form a binder. Various solvents of the aliphatic or aromatic type may be used, however, a combination solvent of xylene and toluene is preferred. With this combination the polymer rapidly dissolves and in addition the xylene appears to control the evaporation rate. Once the binder is prepared a release agent of boron nitride powder is added in and mixed until the powder is dispersed throughout the binder to form a stop-off compound. This stop-off compound is effective as a release agent and stop-off for numerous metals, such as, but not limited to, aluminum, stainless steel and titanium. A preferred consistency of stop-off uses about 48 weight percent boron nitride in 52 weight percent binder obtained by combining 1 part polyisobutylene, 6 to 8 parts xylene, 5 to 7 parts toluene and 11 to 14 parts boron nitride with all parts being by weight. This gives a viscous compound that is applied in a uniform thickness with sharply defined lines in an intricate pattern using screen printing methods of application, otherwise known as silkscreen methods.

The figures show a pair of metal parts 10 and 12 to be joined in layers by diffusion bonding. A layer 14 of stop-off material has been placed on a surface of part 12. This stop-off preferably is applied by the silkscreen method to give a uniform layer covering the entire surface except for the circular areas 16 arranged throughout the center of the surface, and the scalloped area 18 around the periphery of the surface. When the parts 10 and 12 are brought together and diffusion bonded, the circular uncoated areas 16 and the scalloped uncoated areas 18 will be bonded while the coated areas 14 will not bond.

The stop-off may be diluted with additional solvent to permit application by brushing or spraying, but the consistency for silkscreen application is preferred.

These stop-off compounds particularly lend themselves to acting as a release agent during diffusion bonding of layers of titanium. Prior to the bonding a silkscreen stencil is located on a titanium part and the stop-off material pressed onto the part through the stencil to provide a clear-cut uniform layered coating in the areas one wishes to remain unbonded.

When preparing the binder for the stop-off, the polyisobutylene, even using the combination xylene-toluene solvent, takes from about 24 to 36 hours before the polyisobutylene is completely dissolved. Once the binder is prepared, however, it may be stored for an indefinite period in a tightly sealed contained and mixed with the boron nitride just before use.

We claim:

1. An article of manufacture comprising: a layered metal structure, a coating arranged in patterns between contiguous layers of the metal with said coating comprising a powdered boron nitride dispersed in a viscous liquid of polyisobutylene dissolved in xylene and toluene.

2. An article of manufacture comprising a layered metal structure, a coating arranged in patterns between contiguous layers of the metal with said coating comprising 11 to 14 parts boron nitride dispersed in a viscous liquid of 1 part polyisobutylene dissolved in 6 to 8 parts xylene and 5 to 7 parts toluene with all parts being by weight.

3. An article of manufacture comprising:
a layered titanium structure, a coating arranged by silkscreen methods in intricate patterns between contigous layers of the titanium with said coating comprising a powdered boron nitride dispersed in a viscous liquid of polyisobutylene dissolved in xylene and toluene.

4. An article of manufacture comprising a layered titanium structure, a coating arranged by silkscreen methods in intricate patterns between contiguous layers of the titanium with said coating comprising 11 to 14 parts boron nitride dispersed in a viscous liquid of 1 part polyisobutylene dissolved in 6 to 8 parts xylene and 5 to 7 parts toluene with all parts being by weight.

* * * * *